United States Patent Office 2,918,443
Patented Dec. 22, 1959

2,918,443

VINYL CHLORIDE-VINYL ACETATE COPOLYMER DISSOLVED IN SOLVENT MIXTURE CONTAINING AROMATIC HYDROCARBON AND PYRROLIDONE COMPONENT

Gerald P. Roeser, Lahaska, Pa., assignor to American-Marietta Company, Stoner-Mudge Co. Division, Chicago, Ill., a corporation of Illinois No Drawing. Application January 31, 1957
Serial No. 637,377

6 Claims. (Cl. 260—30.2)

This invention relates to the use of 2-pyrrolidone or its N-aliphatic hydrocarbon substituted derivatives having not more than 4 carbon atoms in the aliphatic hydrocarbon radical, in conjunction with aromatic hydrocarbon solvents to dissolve certain resins, especially copolymers of vinyl chloride and vinyl acetate.

Vinyl polymers and copolymers have become well known in many industries for their valuable properties, and one phase of their development has been a search for suitable solvents to form solutions of the polymers for various purposes, such as protective coatings, films, and various other plastic applications. There are a number of active solvents which have been found to be generally suitable for such purposes, such as isophorone, cyclohexanone and methyl ethyl ketone. Such active solvents are expensive, however, and consequently attempts have been made to find less expensive substitutes. The common aromatic hydrocarbon solvents are much less expensive, but they can be used only as diluents with more active solvents to dissolves most vinyl polymers and copolymers, with rare exceptions; e.g., straight aromatic hydrocarbon solvents with vinyl chloride/vinylidone chloride copolymers as disclosed in Gray and Reymann U.S. Patent 2,675,334. In the case of copolymers of vinyl chloride and vinyl acetate, which are among the most widely accepted and useful of the vinyl compounds, particularly in the protective coating field, it is necessary to use expensive active solvents, either exclusively or in relatively large proportions with aromatic hydrocarbon solvents, in order to dissolve the vinyl chloride/vinyl acetate copolymers sufficiently to obtain a solution of suitable viscosity containing a desirable proportion of dissolved copolymer. The resultant expense and other difficulties have led to a long continued search for other solvent materials which could be used in smaller proportions with aromatic hydrocarbon solvents for obtaining suitable solutions of vinyl chloride/vinyl acetate copolymers.

I have discovered that there is a synergistic relation between N-aliphatic hydrocarbon substituted derivatives of 2-pyrrolidone having not more than 4 carbon atoms in the aliphatic hydrocarbon group, and liquid aromatic hydrocarbon solvents such as benzene, toluene and xylene, whereby the combination of the two is highly effective when used with certain resins, particularly copolymers of vinyl chloride and vinyl acetate containing less than about 92% by weight of vinyl chloride. There is a like synergistic relation between 2-pyrrolidone itself, and such liquid aromatic hydrocarbon solvents, but it does not produce as strong a resin solvent action. The special relation between the 2-pyrrolidone component of the solvent system and the aromatic hydrocarbon component is illustrated by the fact that neither one of said components used alone is capable of dissolving the aforesaid vinyl chloride/vinyl acetate copolymers, but the combination of the two components does dissolve them. A similar combination effect is observed in the case of said N-substituted derivatives, except that the latter have some solvent power even when used without the aromatic hydrocarbon component. The combination is particularly valuable because of its usefulness as a solvent for vinyl chloride/vinyl acetate copolymers, which are of major commercial importance, and because a very high percentage of the aromatic hydrocarbon component, which is relatively inexpensive, can be used in the solvent mixture for purposes of dissolving vinyl chloride/vinyl acetate copolymers, in spite of the fact that such copolymers are noted for their resistance to dissolution in conventional solvent mixtures containing like percentages of such aromatic hydrocarbon component.

The solvent composition of the invention broadly consists of the combination of (1) 2-pyrrolidone or its N-aliphatic hydrocarbon substituted derivatives having not more than 4 carbon atoms in the aliphatic hydrocarbon radical (e.g., N-methyl 2-pyrrolidone and N-vinyl 2-pyrrolidone), or mixtures of said derivatives, or mixtures of 2-pyrrolidone with one or more of said derivatives, with (2) a mono-nuclear aromatic hydrocarbon solvent.

The efficacy of the N-aliphatic hydrocarbon substituted derivatives of 2-pyrrolidone decreases as the molecular weight of the substituent increases. Thus, of the saturated alkyl substituents, methyl and ethyl groups are the most effective. Propyl is less effective and butyl is still less effective as a substituent alkyl group. As a practical matter, by the time the alkyl substituent contains as many as 5 carbon atoms, the solvent efficiency has decreased ot such an extent that higher alkyl groups such as pentyl and hexyl are not desirable in comparison with the use of methyl and ethyl substituents.

Particularly suitable mono-nuclear aromatic hydrocarbon solvents are benzene, toluene and xylene. Any of the isomeric xylenes can be used although commercial mixtures of the various xylenes are preferred, these being less expensive. In the mono-nuclear alkyl-substituted aromatic hydrocarbon solvent or mixtures thereof which can be used, lower alkyl substituents are preferred. Thus mono, di- and tri-substituted benzenes may be employed and suitable solvents include ethyl benzene and mesitylene. Propyl and butyl substituted benzenes may also be used.

When used as a solvent for copolymers of about 87% by weight of vinyl chloride and about 13% by weight of vinyl acetate, the solvent composition of the invention in the case of 2-pyrrolidone is effective in a range of proportions of about 10% to about 95% by weight of 2-pyrrolidone, based on the combined weight of the 2-pyrrolidone and the aromatic solvent. For relatively low viscosity at relatively high solids content of said resin in the said solvent composition, the said range is preferably about 10% to about 50% by weight of 2-pyrrolidone. When used as a solvent for said 87/13 copolymers of vinyl chloride and vinyl acetate, the solvent composition of the invention in the case of N-methyl pyrrolidone is effective when it contains as little as about 7% by weight of N-methyl pyrrolidone, and in the case of N-vinyl pyrrolidone the solvent composition of the invention is effective when it contains as little as about 10% by weight of N-vinyl pyrrolidone. For relatively low viscosity at relatively high solids content of said resin dissolved in a solvent composition of (1) 2-pyrrolidone or one or more N-aliphatic hydrocarbon substituted derivatives of 2-pyrrolidone having not more than 4 carbon atoms in the aliphatic hydrocarbon radical, or mixtures thereof, with (2) a mono-nuclear aromatic hydrocarbon solvent, the preferred range of proportions of component (1) in the solvent composition is about 10% to about 50% by weight, based on the combined weights of the pyrrolidone component and the aromatic solvent component. The relatively great cost of the pyrrolidone component makes it inadvisable to increase the proportion thereof above 50% especially since such increase in proportion above 50% lowers the solvent power of the combination. However, the advantages of the invention are obtained when more than 50% of the pyrrolidone component is present, although this is not preferred. As the proportion of vinyl chloride in the copolymer is decreased below 87% the greater solvency of the vinyl acetate in the copolymer makes the composition of the invention effective as a solvent for the copolymer with a progressively smaller minimum and larger maximum proportion of 2-pyrrolidone, or with a progressively smaller minimum proportion of N-aliphatic hydrocarbon substituted derivatives of 2-pyrrolidone having not more than 4 carbon atoms in the aliphatic hydrocarbon radical.

In the results which are reported hereinafter, the viscosities of various solutions are compared. As will be appreciated, for a given proportion of dissolved solids, the existence of a lower viscosity (expressed as a smaller number of seconds) is indicative of the provision of a more workable solution and is also indicative of the ability of the solvent to dissolve a greater proportion of the resin.

The following Table I shows the effectiveness of 2-pyrrolidone and N-methyl pyrrolidone as compared with cyclohexanone and isophorone when used in various proportions with xylene, in terms of viscosities (in seconds at 80° F. with a #4 Ford cup) of compositions consisting of uniform samples of vinyl chloride/vinyl acetate copolymer (87/13 ratio, "VYHH") at 18% solids by weight in the various solvent mixtures (component ratios by weight):

TABLE I
*Comparative viscosities when using the new and conventional active solvents with xylene*

| Ratios of solvent components in col. headings (1)-(4) | Viscosities (seconds at 80° F. with #4 Ford cup) of 18% solids "VYHH" in the following solvent combinations | | | |
|---|---|---|---|---|
| | (1) (cyclohexanone and xylene) | (2) (isophorone and xylene) | (3) (2-pyrrolidone and xylene) | (4) (N-methyl 2-pyrrolidone and xylene) |
| Active solvent/aromatic hydrocarbon: | | | | |
| 100/0 | 75 | 127 | Swollen | 67. |
| 95/5 | 69 | 103 | 540 | 61. |
| 75/25 | 52 | 89 | 211 | 49. |
| 50/50 | 42 | 62 | 86 | 39. |
| 33/67 | 42 | 60 | 65 | 33. |
| 25/75 | 47 | 68 | 60 | 33. |
| 15/85 | 68 | Gel | 64 | 34. |
| 10/90 | Swollen | Swollen | 71 | 50. |
| 9/91 | do | do | Swollen | 81. |
| 7.5/92.5 | do | do | do | 86. |
| 5/95 | do | do | do | Swollen. |
| 0/100 | Insoluble | Insoluble | Insoluble | Insoluble. |

The following Tables II and IIA show the effect of using various aromatic hydrocarbon components in various proportions with 2-pyrrolidone and N-methyl 2-pyrrolidone in terms of viscosity (in seconds at 80° F. with #4 Ford cup) of compositions consisting of uniform samples of vinyl chloride/vinyl acetate copolymer (87/13 ratio, "VYHH") at 18% solids by weight in the various solvent mixtures:

TABLE II
*Comparative viscosities when using 2-pyrrolidone with different aromatic hydrocarbons*

| (1) Ratio of 2-pyrrolidone to the aromatic hydrocarbon specified in adjacent headings (by weight) | Viscosities (seconds at 80° F. with #4 Ford cup) of 18% solids "VYHH" in solvent combination of the pyrrolidone specified in first column with— | | | |
|---|---|---|---|---|
| | Benzene | Toluene | Xylene | Solvesso #100 |
| 100/0 | Swollen | Swollen | Swollen | Swollen. |
| 75/25 | 249 | 232 | 211 | 300. |
| 50/50 | 102 | 89 | 86 | 130. |
| 25/75 | 66 | 56 | 60 | 96. |
| 0/100 | Insol | Insol | Insol | Insol. |

TABLE IIA
*Comparative viscosities when using N-methyl pyrrolidone with different aromatic hydrocarbons*

| (2) Ratio of N-methyl 2-pyrrolidone to the specified aromatic hydrocarbon (by weight) | Viscosities (seconds at 80° F. with #4 Ford cup) of 18% solids "VYHH" in solvent combination of the pyrrolidone specified in first column with— | | | |
|---|---|---|---|---|
| | Benzene | Toluene | Xylene | Solvesso #100 |
| 100/0 | 67 | 67 | 67 | 67. |
| 75/25 | 50 | 49 | 49 | 53. |
| 50/50 | 41 | 37 | 39 | 46. |
| 25/75 | 35 | 32 | 33 | 42. |
| 0/100 | Insoluble | Insoluble | Insoluble | Insoluble. |

In the above Table II, "Solvesso #100" (Esso Standard Oil Co., New York, N.Y.) is a commercial mixed aromatic hydrocarbon solvent and includes a minor amount of aliphatic solvents. Typical physical data for Solvesso #100 is shown in the listing which follows:

| | Solvesso #100 |
|---|---|
| Specific gravity at 60/60° F | 0.8749 |
| Flash, ° F. (Tag closed cup) | 100 min. |
| Distillation ASTM (D268): | |
| Initial boiling point, ° F | 306 |
| 10% | 311 |
| 50% | 317 |
| 90% | 327 |
| Dry point, ° F | 343 |
| Final boiling point, ° F | ---- |
| Viscosity, cp. at 25° C | 0.797 |
| K-B value (toluol=100) | 90 |
| K-B value (after 75% is evaporated) | 98 |
| Mixed aniline point, ° C | 12.0 |
| Percent aromatics | 99.5 |

When commercial naphthene spirits or aliphatic hydrocarbons are used with 2-pyrrolidone or N-substituted pyrrolidones in any proportions as a solvent for the same copolymer, the results are total insolubility or close to it.

The following Table III shows the effectiveness of 2-pyrrolidone and N-methyl pyrrolidone and xylene with various kinds of vinyl resins, in terms of comparative viscosities (in seconds at 80° F. with #4 Ford cup) when using said pyrrolidones and xylene separately and in various combined proportions, with the resins:

TABLE III
*Comparative viscosities with different resins*

[Seconds at 80° F. with #4 Ford cup.]

| Resin | Percent Total Solids | Ratio 2-pyrrolidone/xylene (by weight) | | | | |
|---|---|---|---|---|---|---|
| | | 100/0 | 95/5 | 50/50 | 10/90 | 0/100 |
| "VYHH" | 18 | Swollen | 540 | 86 | 71 | Insol. |
| "VYLF" | 20 | 236 | 171 | 26 | 27 | Insol. |
| "VMCH" | 18 | Gel | Gel | 113 | Swollen | Insol. |
| "VAGH" | 18 | Gel | | 169 | do | Insol. |
| "VYNS" | 18 | Gel | | 300 | do | Insol. |
| "QYNV" | 10 | Insol | | Gel | | Insol. |
| "Exon 402" | 10 | Insol | | Insol | | Insol. |

| | | Ratio of N-methyl pyrrolidone/xylene (by weight) | | | | |
|---|---|---|---|---|---|---|
| | | 100/0 | 95/5 | 50/50 | 10/90 | 0/100 |
| "VYHH" | 18 | 67 | 61 | 39 | 50 | Insol. |
| "VYLF" | 20 | 21 | | 17 | | Insol. |
| "VMCH" | 18 | 68 | | 38 | | Insol. |
| "VAGH" | 18 | 94 | | 51 | | Insol. |
| "VYNS" | 18 | 143 | | 84 | | Insol. |
| "QYNV" | 10 | Gel | | | | Insol. |
| "Exon 402" | 10 | Gel | | | | Insol. |

In the above Table III, "VYHH" and "VYLF" (Union Carbide and Carbon Corporation, New York, N.Y.) are copolymers of vinyl chloride and vinyl acetate in proportions of 87/13 by weight, the difference between the two lying in the fact that "VYHH" has a higher molecular weight. "VMCH" (Union Carbide and Carbon Corp.) is a copolymer of vinyl chloride, vinyl acetate and maleic acid, in proportions by weight of 86/13/1. "VAGH" (Union Carbide and Carbon Corp.) is a partially hydrolyzed copolymer of vinyl chloride and vinyl acetate, the copolymer being originally like "VYHH," but changed by hydrolysis to proportions by weight of 6% vinyl alcohol, 3% vinyl acetate and 91% vinyl chloride. "VYNS" (Union Carbide and Carbon Corp.) is a copolymer of vinyl chloride and vinyl acetate in proportions by weight of 90/10. "QYNV" (Union Carbide and Carbon Corp.) and "EXON 402" (Firestone Plastics Co., Pottstown, Pennsylvania) are polymers consisting entirely of polyvinyl chloride.

The mixed solvent of the invention is effective with copolymers of vinyl chloride and vinyl acetate containing less than 90% by weight of vinyl chloride. There is no upper limit on the amount of vinyl acetate in the copolymer because the vinyl acetate component is relatively easily dissolved. For example, 100% vinyl acetate polymer dissolves in 100% toluene, in 100% N-methyl 2-pyrrolidone, and in any mixture of toluene with 2-pyrrolidone containing not more than 90% 2-pyrrolidone.

The properties of N-aliphatic hydrocarbon substituted derivatives of 2-pyrrolidone having not more than 4 carbon atoms in the aliphatic hydrocarbon radical are similar to each other, except for higher viscosities as the number of said carbon atoms is increased from one to four. For example, mixtures of N-vinyl pyrrolidone (2 carbon atoms in the aliphatic hydrocarbon radical) and xylene in proportions by weight of 100/0, 50/50, 15/85, 12.5/87.5 and 10/90 with 18% solids of "VYHH," have viscosities of about 100, 50, 50, 61 and 201 seconds, respectively, in No. 4 Ford cup at 80° F., for purposes of comparison with comparable viscosities for N-methyl pyrrolidone (1 carbon atoms in the aliphatic hydrocarbon radical) in Table I above. As the date of Table I and this paragraph demonstrate, the most efficient of the pyrrolidone species for the purposes of the invention is N-methyl pyrrolidone.

The new solvent systems of the invention can be used alone or in conjunction with other solvents. Thus, up to about 5% of the aromatic hydrocarbon component may be replaced by aliphatic solvents, such as mineral spirits, although it is not preferred to do this unless the aliphatic solvents are contained in the commercial aromatic mixtures which are used. The point to be noted is that the solvent systems of the invention can tolerate the presence of minor quantities of aliphatic solvents.

The new solvent systems of the invention can also be combined with appropriate minor quantities, as for example up to about 30% of active solvents for the purpose of enhancing the solvent mixtures of this invention. Thus, methyl ethyl ketone, Cellosolve acetate, dimethyl formamide, cyclic ketones such as cyclohexanone, isophorone, etc., may be added to the mixtures of 2-pyrrolidone and N-hydrocarbon substituents thereof with mono-nuclear aromatic hydrocarbon solvents of the invention.

Compositions employing the polymer and solvent combinations of the invention are useful for protective coating and other purposes for which vinyl chloride/vinyl acetate solutions are used. For example, a composition of the above-described "VYHH" vinyl chloride/vinyl acetate copolymer at 16.5% applied solids in solvent consisting of 67% xylene and 33% 2-pyrrolidone was filmed on tinplate at about 4.6 mg./sq. in. and baked thereon at 325° F. for ten minutes. The coating was tested for color, clarity, flow, adhesion, insolubility, flexibility, and, after pasteurization at 170° F. for 45 minutes, for blistering, spotting and wet adhesion. For purposes of comparison, a composition of the same copolymer at 18% applied solids in solvent consisting of 67% xylene and 33% isophorone was filmed on like specimens at about 5.4 mg./sq. in. and then baked and tested as stated above. The results were essentially the same in both cases, showing that coating qualities are not adversely affected by substitution of 2-pyrrolidone for such standard solvents as isophorone in coating compositions of vinyl chloride/vinyl acetate copolymers. Similar results were obtained when similar comparative tests were made with N-methyl 2-pyrrolidone in place of 2-pyrrolidone. The composition of the invention can have a viscosity range of 20 to 150 seconds in #4 Ford cup at 80° F., and a solids concentration of vinyl chloride/vinyl acetate copolymer of up to about 24% by weight, for most protective coating purposes, but these ranges can be exceeded for some protective coating purposes.

Pigments, dyes, waxes and other non-reactants may be added to the composition of the invention for decorative purposes and the like, without otherwise materially affecting the significant characteristics of the composition.

While I have described present preferred embodiments of the invention and methods of practicing the same, it will be recognized that the invention is not limited thereto but may be otherwise variously embodied and practiced within the scope of the following claims.

I claim:

1. A resin composition comprising a copolymer of vinyl chloride and vinyl acetate which is difficultly soluble in mono-nuclear aromatic hydrocarbon solvents and which contains less than about 92% by weight of vinyl chloride dissolved in a solvent medium, the effective solvent medium consisting of a first component selected from the group consisting of 2-pyrrolidone, N-aliphatic hydrocarbon substituted derivatives of 2-pyrrolidone having not more than 4 carbon atoms in the aliphatic hydrocarbon radical and mixtures of the foregoing, and a second component constituted by a liquid mono-nuclear aromatic hydrocarbon solvent selected from the group consisting of benzene, alkyl benzenes and mixtures thereof, the said first component being present in an amount of at least 7% by weight up to 50% by weight based on the combined weight of the said first and the said second components when said first component is N-methyl-2-pyrrolidone and said first component being present in an amount of at least 10% on the same basis when said first component is a member selected from said group other than N-methyl 2-pyrrolidone.

2. A resin composition as recited in claim 1 in which said copolymer contains about 87% by weight of vinyl chloride with the balance of said copolymer being vinyl acetate.

3. A resin composition comprising a copolymer of vinyl chloride and vinyl acetate which is difficultly soluble in mono-nuclear aromatic hydrocarbon solvents and which contains less than 92% by weight of vinyl chloride dissolved in a solvent medium, the effective solvent medium consisting of 2-pyrrolidone and a liquid mono-nuclear aromatic hydrocarbon solvent selected from the group consisting of benzene, alkyl benzenes and mixtures thereof, said 2-pyrrolidone being present in an amount of at least 10% by weight up to 50% by weight based on the combined weight of said 2-pyrrolidone and said aromatic solvent.

4. A resin composition as recited in claim 3 in which said aromatic solvent is xylene.

5. A resin composition comprising a copolymer of vinyl chloride and vinyl acetate which is difficultly soluble in mono-nuclear aromatic hydrocarbon solvents and which contains less than 92% by weight of vinyl chloride dissolved in a solvent medium, the effective solvent medium consisting of N-methyl 2-pyrrolidone and a liquid mono-nuclear aromatic hydrocarbon solvent selected from the group consisting of benzene, alkyl benzenes and mixtures thereof, the said N-methyl 2-pyrrolidone being present in an amount of at least 7% by weight up to 50% by weight based on the combined weight of said N-methyl 2-pyrrolidone and said aromatic solvent.

6. A resin composition as recited in claim 5 in which said aromatic solvent is xylene.

References Cited in the file of this patent
UNITED STATES PATENTS

| | | |
|---|---|---|
| 2,439,395 | Leatherman | Apr. 13, 1948 |
| 2,616,868 | Heisenberg et al. | Nov. 4, 1952 |